G. A. WITTE.
APPARATUS FOR ELECTRICAL PRECIPITATION OF SUSPENDED PARTICLES FROM GASES.
APPLICATION FILED JUNE 4, 1918.
1,407,311. Patented Feb. 21, 1922.
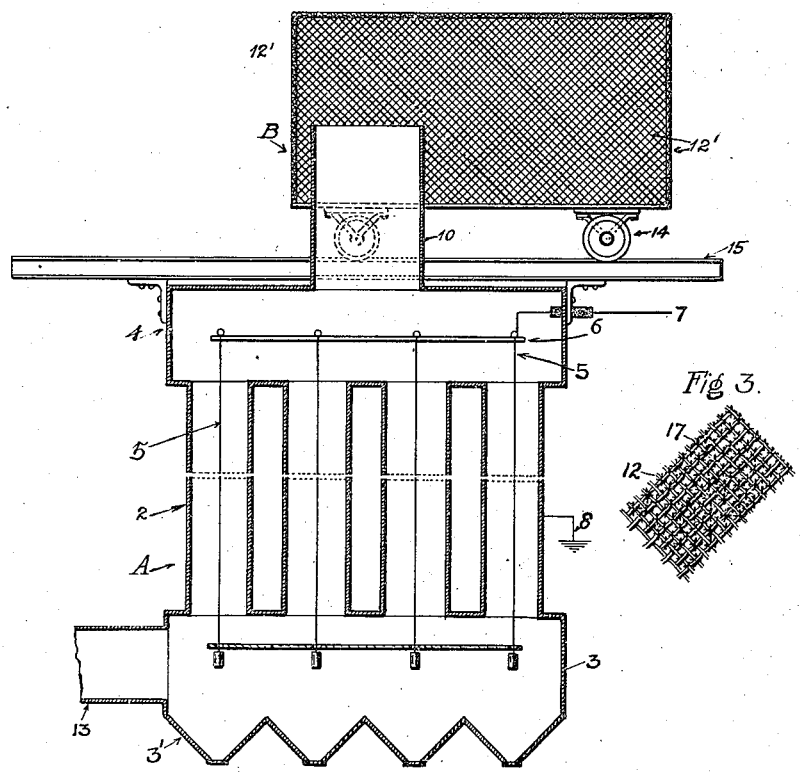
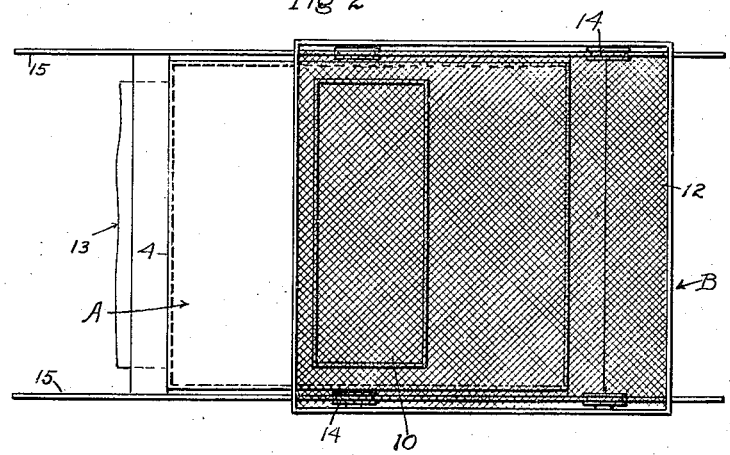
INVENTOR
GUSTAV A. WITTE
BY
ATTORNEY

UNITED STATES PATENT OFFICE.

GUSTAV A. WITTE, OF PHILADELPHIA, PENNSYLVANIA, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL PRECIPITATION OF SUSPENDED PARTICLES FROM GASES.

1,407,311.  Specification of Letters Patent.  Patented Feb. 21, 1922.

Application filed June 4, 1918. Serial No. 238,167.

*To all whom it may concern:*

Be it known that I, GUSTAV A. WITTE, a citizen of the United States, residing at Philadelphia, in the county of Philadelphia, State of Pennsylvania, have invented a new and useful Apparatus for Electrical Precipitation of Suspended Particles from Gases, of which the following is a specification.

This invention relates to the precipitation of smoke, fume or dust from gases by the action of an electrical field, and the main object of the invention is to increase the efficiency of such electrical precipitating apparatus.

In the operation of electrical precipitating apparatus, wherein the gases are passed through an electrical field and are subjected to the action of electrical discharge therein, the primary effect of such discharge is to ionize the gases and electrically charge the particles of the dust or fume. The action of the electrical field then causes such charged particles to be forced against the electrodes of the apparatus so as to separate such particles from the gases. It has been found that in some cases the separation of the suspended particles from the gases by this operation is only partial and that a considerable portion of the suspended particles pass through the apparatus without being precipitated. Furthermore, it has been found in some cases that the effluent from the electrical precipitating apparatus carries considerable electrical charge, either in the gases or on the suspended particles therein. An important object of the present invention is to effect a further collection of the fumes, dust, etc. after the same has been subjected to the operation of an electrical precipitating apparatus, and a further object of the invention is to utilize the excess of electrical charges carried by the gas or by the suspended particles therein in promoting or effecting such separation of the residual suspended particles.

The objects above stated are obtained according to my invention by interposing in the path of the effluent from an electrical treater a filtering means, acting as a grounded conductor, or at least a conductor adapted to maintain an attractive effect on the charged suspended particles, whereby the suspended particles in such effluent are to a greater or less extent attracted by such conducting filter and caused to adhere to same, and are thereby separated from the gases passing from the electrical precipitator.

The accompanying drawings illustrate an embodiment of my invention and referring thereto:

Fig. 1 is a vertical section of an electrical precipitator with the supplementary filtering means therefor. Fig. 2 is a plan view thereof. Fig. 3 is a partial plan view of a portion of the screen of the supplementary filter.

The apparatus shown in the drawing comprises an electrical precipitator A and a supplementary separator or filter B. Said electrical precipitator may be of any usual or suitable type, being herein shown as of the multiple flue type and comprising a series of vertical pipes 2 constituting collecting electrodes and connected at their lower ends to an inlet header 3 and at their upper ends to an outlet header 4; and discharge electrodes 5 formed as wires extending vertically and axially in the respective tubes 2, and hung from suitable insulated support 6. A wire 7 leads to said insulating support from a suitable source of high tension unidirectional current such as is generally used in electrical precipitating apparatus adapted to furnish continuous or intermittent direct current at a potential difference of 50,000 volts or over. The collecting electrodes 2 which are preferably of metal or other conducting material, are grounded as indicated at 8 to complete the circuit. Any other suitable construction of electrical precipitator may be used in connection with my invention and in any case it is preferred to connect the outlet header 4 of the electrical precipitator to a stack 10, through which the effluent of the treater or electrical precipitating apparatus passes. The inlet header 3 is connected to a flue 13, which may be a furnace flue or other flue for conducting gases carrying dust, fume, smoke or mist.

The filter means B is arranged over the stack 10, and consists in the form shown in the drawing, of an inverted box having top 12 and side and end walls 12' formed of suitable perforate material such as wire mesh or screen, the bottom of said filter box being preferably open so as to allow the filter box to be moved horizontally to change its position relative to the stack 10, and to facilitate such movement of the filter box the same is preferably mounted by wheels 14 on rails 15. This filter box is preferably of metal or similar material and is grounded through the rails 15 and the casing of the precipitating apparatus.

In the operation of the apparatus as above described the gases containing suspended material such as fumes, dust, smoke or fog of suspended solid or liquid particles passing from inlet flue 13 to the inlet header 3 and then through the collecting electrode flues 2 to the outlet header 4 and then out through stack 10. In passing through the collecting electrode flues 2, the gases are subjected to the action of electrical discharge emanating from the discharge electrodes 5, whereby the suspended particles are charged and the particles so charged are then forced by the action of the electrical field toward the collecting electrodes and are largely precipitated thereon. In the cases where this invention is intended for the special use a considerable portion of the suspended particles receive a charge in passing through the electrical precipitator in this manner, but fail to be deposited on the collecting electrodes and are permitted to pass out through the stack or outlet flue of the electrical precipitator. It is found, for example, that in such cases a strong electrical charge can be drawn from any conductor placed in the path of the effluent gases from such an electrical precipitator under the conditions stated. With the filter box B arranged as above described and extending over and around the outlet stack 10 the gases passing from the treater with the charged particles therein contained are forced to pass through and in contact with the filter or screen means 12 and the electrically charged particles are attracted toward the grounded conductors constituted by the said screen means and adhere to such screen means, the effect of which is therefore to filter out the charged particles to a greater or less extent from the stream of the effluent gases. I have found that the attractive effect of the screen on the charged particles in the gases can be considerably increased by providing points or sharp edges on the screen, for example, barbs, as indicated at 17 in Fig. 3, (said barbs being twisted on or otherwise secured to, the screen,) there being a tendency for the electrically charged particles to approach and adhere to such points.

In case the supplementary filter B becomes clogged with deposited material it may be moved along the rails 15 so as to bring a different portion thereof above the stack 10 and the deposit already collected on the supplementary filter may be removed by hammering or otherwise. Suitable means, not shown, may also be provided for removing deposited material from the collected electrodes 2 of the electrical precipitator, the inlet flue 3 being provided with suitable means such as bins 3' for receiving the material dislodged from the collecting electrodes and falling into the lower header. The material removed from the supplementary filter B may be received in suitable means or may be allowed to pass into the atmosphere when dislodged from said filter. Any other construction of supplementary separating means may be used in case of the screen means B, such supplementary separating means comprising, in any case, suitable perforate or pervious conducting material in which the electrically charged suspended particles may collect.

In the operation of the above described apparatus one effect of the electrical field in the electrical precipitator A, by reason of the unidirectional discharge from the discharge electrodes, is to cause more or less agglomeration of the suspended or fume particles in the gases and the comparatively large flakes thus produced are especially susceptible to collection by the filter or screen means B.

What I claim is:

1. The combination with an electrical precipitator provided with discharge electrodes and collecting electrodes, and means for maintaining unidirectional high potential difference between said electrodes, of a screen-filter in the path of the gases passing out of the treater, said filter having substantially the same potential as the collecting electrodes.

2. The combination of an electrical precipitator provided with inlet means, outlet means, collecting electrodes forming passages connecting said inlet means with said outlet means and discharge electrodes mounted in said passages for discharging electricity in the gases passing through said passages, means for maintaining unidirectional high potential difference between said electrodes, and a supplementary separator mounted in the path of the effluent from said outlet means and comprising perforate grounded conducting means adapted to be traversed by the said effluent gases in such manner as to cause the charged suspended particles in said effluent gases to adhere to said perforate conducting means.

3. The combination of an electrical precipitator provided with inlet means, outlet means, collecting electrodes forming passages connecting said inlet means with said outlet means and discharge electrodes mounted in said passages for discharging electricity in the gases passing through said passages and a supplementary separator comprising a perforate metal screen mounted in the path of the effluent from said electrical precipitator, said screen being moveably mounted to bring different portions thereof into the path of such effluent.

4. The combination with an electrical precipitator provided with discharge electrodes and collecting electrodes, and means for maintaining unidirectional high potential difference between said electrodes, of a conducting-filter in the path of the gases passing out of the treater, said filter having substantially the same potential as the collecting electrodes.

In testimony whereof I have hereunto subscribed my name this 3rd day of June 1918.

GUSTAV A. WITTE.